United States Patent
Perset et al.

[11] Patent Number: 6,155,042
[45] Date of Patent: Dec. 5, 2000

[54] EXHAUST GAS RECIRCULATION LINE FOR AN AUTOMOBILE ENGINE

[75] Inventors: Denis Perset, Paris; Thomas Bauerlein, Creteil, both of France

[73] Assignee: Valeo Thermique Moteur, France

[21] Appl. No.: 09/183,180

[22] Filed: Oct. 30, 1998

[30] Foreign Application Priority Data

Oct. 31, 1997 [FR] France ................ 97 13722

[51] Int. Cl.[7] .................... F02M 25/06
[52] U.S. Cl. ............... 60/278; 60/287; 60/298; 60/291; 60/292; 123/568.12
[58] Field of Search ............. 60/277, 278, 284, 60/287, 288, 298, 605.2, 291, 292; 123/568.12

[56] References Cited

U.S. PATENT DOCUMENTS

| | | | |
|---|---|---|---|
| 3,785,151 | 1/1974 | Holl | 60/277 |
| 5,184,462 | 2/1993 | Schatz | 60/298 |
| 5,205,265 | 4/1993 | Kashiyama et al. | 60/605.2 |
| 5,250,268 | 10/1993 | Geiger | 60/298 |
| 5,617,726 | 4/1997 | Sheridan et al. | 60/605.2 |
| 5,802,846 | 9/1998 | Bailey | 60/278 |
| 5,806,308 | 9/1998 | Khair et al. | 60/278 |

FOREIGN PATENT DOCUMENTS 5-94931  10/1994  Japan .

Primary Examiner—Thomas Denion
Assistant Examiner—Tu M. Nguyen
Attorney, Agent, or Firm—Morgan & Finnegan, LLP

[57] ABSTRACT

An exhaust recirculation of gases in internal combustion engines, notably for automobiles, which has a catalytic converter, recycling apparatus for recycling the exhaust gases and heat recovers apparatus for recovering heat from the exhaust gases. A single heat exchanger is arranged for cooling the recycled exhaust gases and recovering the heat energy from the exhaust gases for heating the passenger compartment of the vehicle and for protecting the catalytic converter from excessively high exhaust temperatures. Valves for diverting exhaust gases, a back-pressure valve and an EGR valve are controlled for this purpose by control electronics. The invention is particularly applicable to direct-injection petrol or diesel engines or to lean-mixture petrol engines.

14 Claims, 1 Drawing Sheet

EXHAUST GAS RECIRCULATION LINE FOR AN AUTOMOBILE ENGINE

FIELD OF THE INVENTION

The present invention concerns an exhaust gas recirculation line for an automobile internal combustion engine, and more particularly such a line comprising a catalytic converter, means of recycling the exhaust gases, and means of recovering heat from the exhaust gases.

DESCRIPTION OF THE PRIOR ART

Firstly, systems for recovering heat from exhaust gases are known.

The operating principle of these systems consists, in the cold start phase, of diverting the exhaust gases to a heat exchanger and then to a flow restriction device which causes a back pressure in the exhaust. The back pressure causes a rise in temperature of the exhaust and therefore makes it possible to recover more heat in the exchanger.

Such a system is particularly useful in direct-injection turbocharged engines, in direct-injection petrol engines or in lean-mixture petrol engines. It is in fact found, in all the aforementioned cases, that the heat recovered from the engine is insufficient to provide suitable heating of the passenger compartment.

It is also known that, with a certain number of internal combustion engines, in particular direct-injection turbocharged diesel engines, the pollution standards require recycling of the exhaust gases (EGR: Exhaust Gas Recirculation). The strictness of future standards will also require the cooling of these recycled exhaust gases.

Typically, an exhaust gas recycling circuit includes a recycling pipe on which an EGR valve and a heat exchanger are installed.

In addition, there is a tendency to bring the catalytic converter closer and closer to the exhaust manifold in automobiles in order to improve the enabling of the catalytic converter. It is known that the latter functions suitably only when it is hot and there is therefore an advantage in shortening its temperature rise time as much as possible.

However, when the engine is under high load, for example on a motorway, the catalytic converter is subjected to continuous temperatures which are very high, and which reduce its service life through the irreversible conversion of the alumina on which the noble metals are deposited. It is therefore desirable, in such phases of high load on the engine, to be able to provide cooling of the exhaust gases in order to increase the service life of the catalyst.

Finally, so as to obtain less polluting exhaust gas emissions, it is desirable to be able to control the temperature of these gases in order to improve the efficiency of the catalytic converters.

The present invention aims to resolve the aforementioned problems by means of an exhaust gas recirculation line which is relatively simple and which in particular incorporates only one heat exchanger.

SUMMARY OF THE INVENTION

To this end, the object of the invention is an exhaust and gas recirculation line for internal combustion engines, notably for automobiles, comprising a catalytic converter, recycling means for recycling the exhaust gases and heat recovery means for recovering heat from the exhaust gases, the recirculation line further comprising:

disposed between the engine and the catalytic converter, a heat exchanger between the exhaust gases and a cooling fluid, in series with restriction means, said restriction means arranged to create a back pressure, said heat exchanger being upstream of said restriction means;

a diversion for said heat exchanger and selection means for selectively directing the exhaust gases in whole or in part into the diversion or into the catalytic coverter;

a recycling pipe for recyling the exhaust gases connected at one of its ends between the heat exchanger and the restriction means and at its other end to an air intake pipe admitting air into the engine;

regulating means for regulating the proportion of recycled exhaust gases in said recyling pipe.

It will be seen below that, according to the state of the aforementioned selection means and regulating means and, if applicable, the state of the restriction means, the heat exchanger mounted as stated above fulfils the three functions indicated. In fact it affords cooling of the recycled exhaust gases, recovery of the heat energy of the exhaust gases for additional heating of the passenger compartment, and protection of the catalyst against excessively high exhaust temperatures.

It will also be seen below that the said restriction means can either be fixed, or comprise an adjustable-opening valve.

In the latter case, control means are preferably arranged to control the restriction means in the closed position in a normal operating mode and in the open position in a full-load mode.

In a preferred embodiment, said control means may be arranged to instruct the regulation means to close the recycling pipe and the selection means to direct the exhaust gases through the heat exchanger and the restriction means, in a cold-start mode, and to instruct the regulation means to allow a given proportion of exhaust gases to recycle and the selection means to direct the remainder of the exhaust gases through the diversion in normal operating mode.

In addition, in a particular embodiment, said control means may be arranged to instruct the regulation means to close the recycling pipe and the restriction means to direct the exhaust gases through the exchanger in full-load mode.

DETAILED DESCRIPTION OF THE INVENTION

Figure 1:
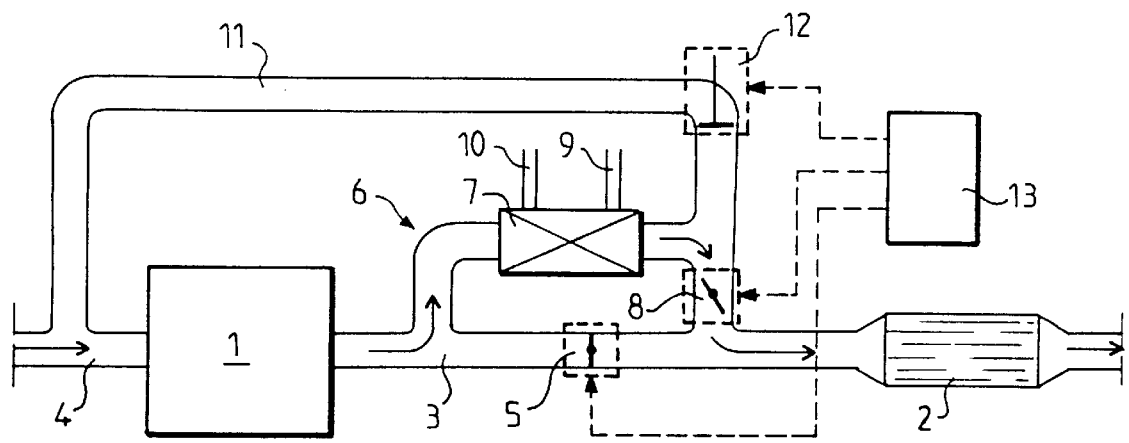
FIGS. 1, 2 and 3 depict an exhaust gas recirculation line according to the invention, respectively in cold start mode, in normal operating mode and in full-load mode.

The figures show an internal combustion engine 1, for example a direct-injection petrol or diesel engine, equipped with an exhaust catalytic converter 2. The pipe 3 connects the exhaust manifold of the engine 1 to the inlet of the catalytic converter 2. In addition, an air intake pipe 4 connects the air filter (not shown) to the manifold admitting air into the engine.

A valve 5, which may be a butterfly valve, is disposed in the pipe 3. A diversion 6 is connected to the pipe 3 on each side of the valve 5.

A heat exchanger 7 and a valve 8, which may also be a butterfly valve, are disposed in series on the diversion 6, the heat exchanger 7 upstream of the valve 8 in the direction of flow of the exhaust gases. The heat exchanger 7 is a gas/water exchanger, the cooling fluid being the engine cooling liquid also used in another water/air heat exchanger, with a view to heating the vehicle passenger compartment. The figures show the ducts 9 and 10 through which the cooling liquid enters and leaves the exchanger 7.

A pipe 11 for recycling the exhaust gases is able to take these gases from the diversion 6 between the outlet of the heat exchanger 7 and the valve 8, in order to return them to the air intake pipe 4 which admits air into the engine. A valve 12, depicted here in the form of a so-called EGR valve, is disposed on the recycling pipe 11.

Finally, control electronics 13, which receives information in a known fashion from a certain number of sensors, controls the valves 5, 8 and 12 according to the operating mode of the engine 1.

FIG. 1 depicts the configuration of the device in cold start mode.

In this mode, the EGR valve 12 is closed. Recycling of the exhaust gases is in fact unnecessary in this phase since the formation of nitrogen oxides NOx is low when the engine is cold. In addition, the valve 5 diverting the exhaust gases is closed, so that these gases use the diversion 6.

In this diversion, the gases escape through the valve 8, which causes a back pressure in the exhaust. Consequently the temperature of the exhaust gases is increased and the exchanger 7 recovers more heat.

The heat thus recovered makes it possible, by means of the cooling fluid of the heat exchanger 7, to initially accelerate the temperature rise of the engine and then to heat the passenger compartment.

Figure 2:
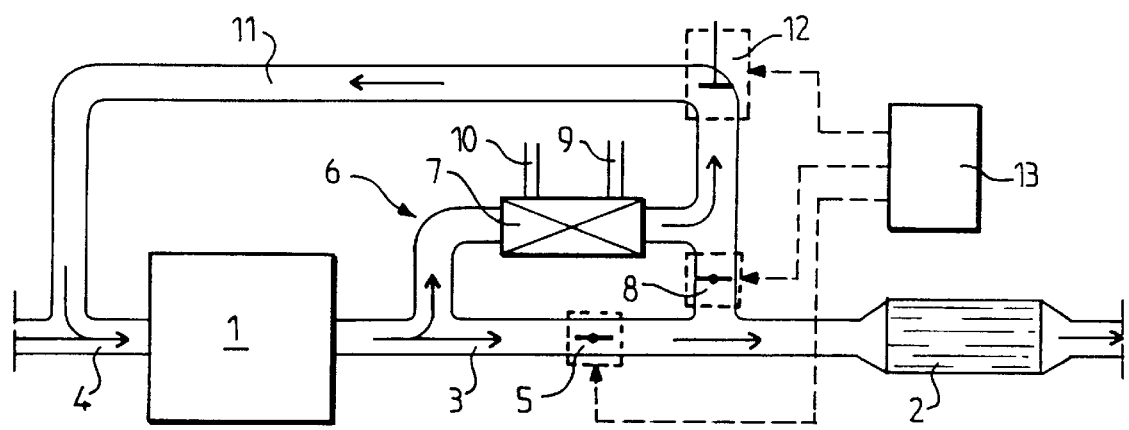

FIG. 2 depicts the normal operating mode of the engine.

In this mode, the valve 5 diverting the exhaust gases is open, thus allowing direct transfer of these gases to the catalytic converter 2. In addition, the back-pressure valve 8 is closed.

With regard to the EGR valve 12, this is open as a function of the recycling ratio determined by the control electronics 13. Consequently, the exhaust gases pass directly through the pipe 3, with the exception of the proportion of gas recycled by means of the pipe 11.

Figure 3:
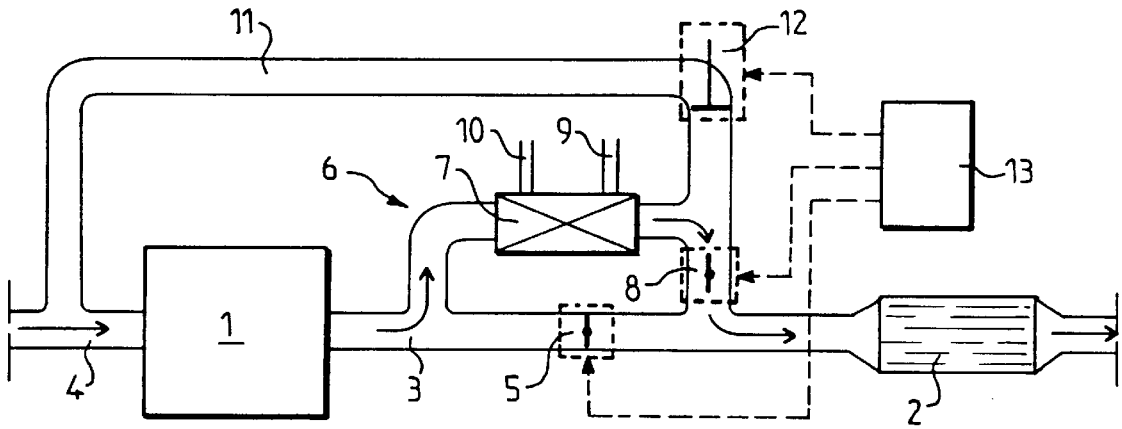

Finally, FIG. 3 illustrates the configuration of the device in the corresponding full-load mode, for example at a high speed on the motorway. In this mode, the temperature of the exhaust gases is very high and it is important to prevent its exceeding the conditions of use of the catalytic converter 2. Moreover, as when cold, exhaust gases are not recycled at full load.

Consequently, in this operating mode, the EGR valve 12 is closed, as is the valve 5 diverting the exhaust gases. On the other hand, the back-pressure valve 8 is completely open.

Thus all the exhaust gases pass through the heat exchanger 7, where they are cooled before entering the catalytic converter 2.

It will be observed that the back-pressure valve 8 could be replaced with a simple fixed restriction. Its effect would be substantially the same as that of the valve 8 in the cold start mode of FIG. 1. However, it would be degraded in the normal operating mode of FIG. 2 and particularly in the full-load mode of FIG. 3. Such a replacement would however reduce the cost of the system.

What is claimed is:

1. An exhaust gas recirculation line for automobile internal combustion engines, comprising a catalytic converter, recycling means for recycling the exhaust gases and heat recovery means for recovering heat from the exhaust gases, said recirculation line further comprising:

a heat exchanger between the exhaust gases and a cooling fluid, disposed between the engine and the catalytic converter, in series with restriction means, the restriction means being downstream of the heat exchanger and arranged to create a back pressure;

a diversion for the heat exchanger and the restriction means and selection means for selectively directing the exhaust gases into the diversion or into the heat exchanger;

a recycling pipe to recycle the exhaust gases, connected at a first end between the heat exchanger and the restriction means and at a second end to an air intake pipe admitting air into the engine; and regulating means for regulating the proportion of recycled exhaust gases in the recycling pipe.

2. An exhaust gas recirculation line as claimed in claim 1, wherein the restriction means are fixed.

3. An exhaust gas recirculation line as claimed in claim 1, further comprising control means arranged to instruct the regulating means to close the recycling pipe and the selection means to direct the exhaust gases through the heat exchanger and the restriction means in a cold-start mode and to instruct the regulating means to allow a given proportion of exhaust gases to recycle and the selection means to direct the remainder of the exhaust gases through diversion in normal operating mode.

4. An exhaust gas recirculation line as claimed in claim 1, wherein the restriction means comprise an adjustable-opening valve.

5. An exhaust gas recirculation line as claimed in claim 4, further comprising control means arranged to control the restriction means to be in the closed position in a normal operating mode and to be in an open position in a full-load mode.

6. An exhaust gas recirculation line as claimed in claim 5, wherein the control means are arranged to instruct the regulating means to close the recycling pipe and the selection means to direct the exhaust gases through the heat exchanger in full-load mode.

7. An exhaust gas recirculation line as claimed in claim 3, wherein the control means are arranged to instruct the regulating means to close the recycling pipe and the selection means to direct the exhaust gases through the heat exchanger in full-load mode.

8. A method of circulating exhaust gases according to an automobile internal combustion engine's mode of operation, comprising the steps of:

positioning selection means, having an open and a closed positions, to the closed position to divert the exhaust gases into a diversion and a catalytic converter;

positioning restriction means to obtain desired back-pressure; and positioning a separate regulating means, having an open and a closed positions, to the open position to divert exhaust gases into a recycling pipe.

9. An exhaust gas recirculation line for automobile internal combustion engines, comprising:

a catalytic converter;

a heat exchanger;

a back pressure valve, having an open and a closed positions, the valve disposed between the heat exchanger and the catalytic converter, the back pressure valve being downstream of the heat exchanger and arranged to create a back pressure;

a diversion for the heat exchanger and the back pressure valve;

a separate diversion valve having an open and a closed positions, the diversion valve disposed between the engine and the catalytic converter, the diversion valve being arranged to selectively divert exhaust gases into the diversion; and a recycling circuit disposed adjacent to the heat exchanger such that when the back pressure valve is in the closed position and the diversion valve is the open position, exhaust gases are recycled back to the engine.

10. An exhaust gas recirculation line according to claim 9, wherein the recycling circuit further comprises:

a regulating valve to regulate a proportion of recycled exhaust gases in the recycling circuit;

an air intake pipe arranged to admit air into the engine; and a recycling pipe arranged to recycle the exhaust gases, the recycling pipe having two ends, a first end being connected between the heat exchanger and the back pressure valve and a second end being connected to the air intake pipe.

11. An exhaust gas recirculation line according to claim 10, further comprising a controller arranged to instruct the back pressure valve to be in the closed position in a normal operating mode and to be in an open position in a full-load mode.

12. An exhaust gas recirculation line according to claim 11, wherein the controller is arranged to instruct the regulating valve to close the recycling pipe and the diverter valve to direct the exhaust gases through the heat exchanger in full-load mode.

13. An exhaust gas recirculation line according to claim 10, further comprising a controller arranged to instruct the regulating valve to close the recycling pipe and the diverter valve to direct the exhaust gases through the heat exchanger and the back pressure valve in a cold-start mode and to instruct the regulating valve to allow a given proportion of exhaust gases to recycle and the diverter valve to direct the remainder of the exhaust gases through the diversion in normal operating mode.

14. An exhaust gas recirculation line according to claim 13, wherein the controller is arranged to instruct the regulating valve to close the recycling pipe and the diverter valve to direct the exhaust gases through the heat exchanger in full-load mode.

* * * * *